United States Patent
Bartley et al.

(10) Patent No.: US 11,641,845 B1
(45) Date of Patent: May 9, 2023

(54) TAILBOARD SYSTEM FOR HORSE STALLS

(71) Applicants: Brett William Bartley, Baldwin City, KS (US); Patricia McCoy Bartley, Baldwin City, KS (US)

(72) Inventors: Brett William Bartley, Baldwin City, KS (US); Patricia McCoy Bartley, Baldwin City, KS (US)

(*) Notice: Subject to any disclaimer, the term of this patent is extended or adjusted under 35 U.S.C. 154(b) by 71 days.

(21) Appl. No.: 17/400,702

(22) Filed: Aug. 12, 2021

Related U.S. Application Data

(60) Provisional application No. 63/065,340, filed on Aug. 13, 2020.

(51) Int. Cl.
*A01K 13/00* (2006.01)

(52) U.S. Cl.
CPC .................. *A01K 13/004* (2013.01)

(58) Field of Classification Search
CPC ...... A01K 1/00; A01K 1/0088; A01K 1/0094; A01K 1/035; A01K 1/0613; A01K 13/004; A01K 29/00; A01K 1/0005; A01K 1/0011; A01K 1/0236; A01K 1/0245; A01K 1/0272; B60P 7/16; B60P 7/065; B60P 3/04; B61D 45/008; B60R 13/02; B60R 21/04; B60R 21/055; B65G 69/00; E04F 19/026
USPC .................. 119/516, 621; 410/119
See application file for complete search history.

(56) References Cited

U.S. PATENT DOCUMENTS

| | | | | |
|---|---|---|---|---|
| 3,847,091 A | * | 11/1974 | Holt ..................... | B61D 45/008 410/128 |
| 4,222,552 A | * | 9/1980 | Matteo, Sr. ............ | E01F 9/669 403/313 |
| 5,540,184 A | * | 7/1996 | D'Agosta .............. | A01K 1/035 119/516 |
| 6,561,740 B1 | * | 5/2003 | Burke ..................... | B61D 3/18 410/117 |
| 6,805,523 B2 | * | 10/2004 | Burke ..................... | B60P 3/08 410/117 |
| 9,789,885 B2 | * | 10/2017 | Stiles ..................... | E01F 9/669 403/313 |

(Continued)

FOREIGN PATENT DOCUMENTS

| | | | | |
|---|---|---|---|---|
| GB | 2330560 A | * | 4/1999 | ............... B60P 3/04 |
| GB | 2409795 A | * | 7/2005 | ........... A01K 1/0005 |

(Continued)

*Primary Examiner* — David J Parsley
*Assistant Examiner* — Danielle A Clerkley
(74) *Attorney, Agent, or Firm* — Frederic Dorwart, Lawyers PLLC; Penina Michlin

(57) ABSTRACT

A tailboard system for horse stalls. A tailboard system for a horse stall includes a plurality of tailboard sections, each tailboard section including a first arched portion between a first pair of integral flanges including an upper flange and a lower flange, the arched portion including a pair of straight, angled sides connected by a rounded tip, and a first tapered end adjacent to a second tapered end of an adjacent section of the plurality of tailboard sections to form a triangular gap therebetween, and a joint strap covering the triangular gap, the joint strap including a second pair of flanges between a second arched portion, and wherein the plurality of tailboard sections are adapted to be mounted by the pair of flanges in a row around at least a portion of an inside perimeter of the horse stall to form the tailboard system.

7 Claims, 10 Drawing Sheets

(56) References Cited

U.S. PATENT DOCUMENTS

2004/0137210 A1* 7/2004 Ochoa ................... B60P 3/04
                                                428/315.9
2012/0080654 A1* 4/2012 Vladislavic ......... E01F 15/0453
                                                256/13.1

FOREIGN PATENT DOCUMENTS

GB         2417407 A  *  3/2006  ........... A01K 1/0094
GB         2424168 A  *  9/2006  ........... A01K 1/0094
WO    WO-2007144095 A1 * 12/2007  ................ B60P 3/04

* cited by examiner

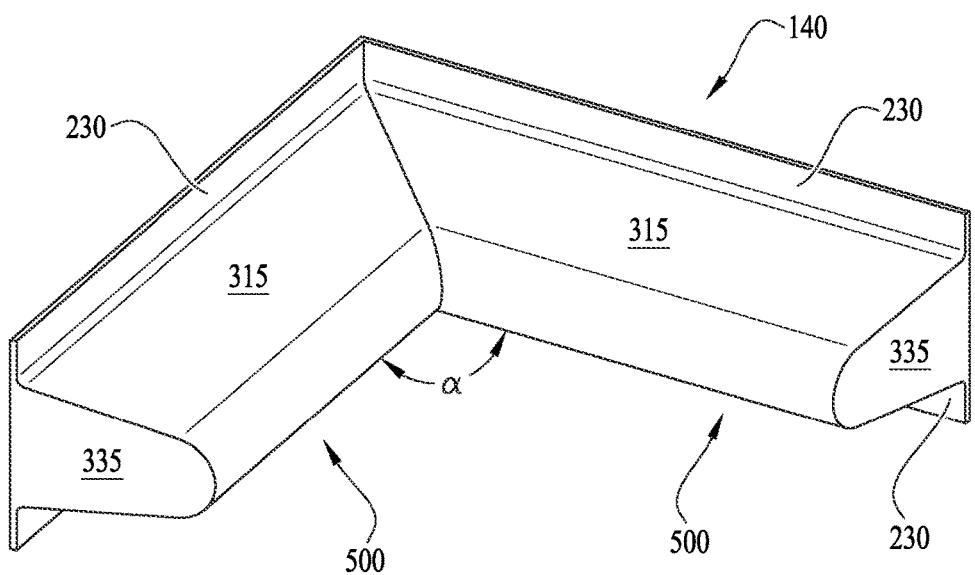
fig. 5D
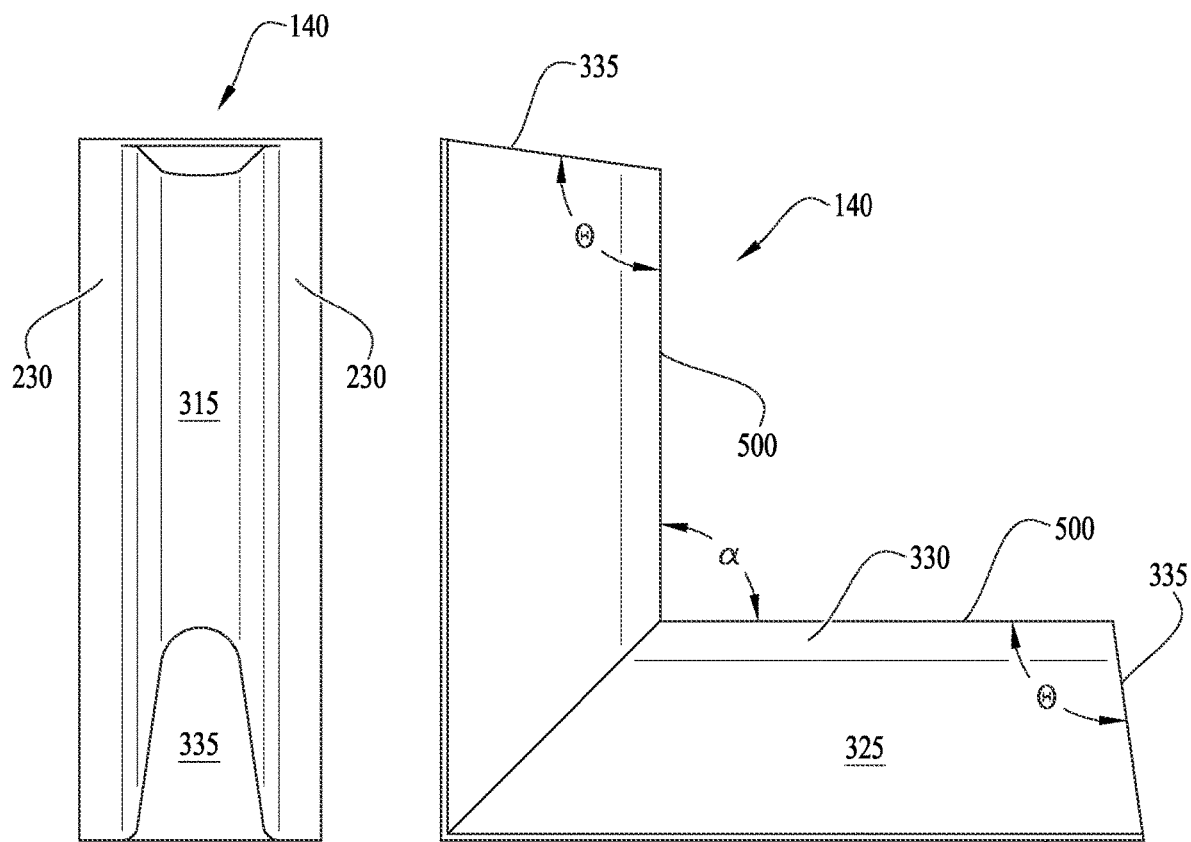
fig. 5E
fig. 5F

TAILBOARD SYSTEM FOR HORSE STALLS

CROSS REFERENCE TO RELATED APPLICATIONS

This application claims the benefit of U.S. Provisional Application No. 63/065,340 to Bartley et al., filed Aug. 13, 2020 and entitled "TAILBOARD SYSTEM FOR HORSE STALLS," which is hereby incorporated by reference in its entirety.

BACKGROUND OF THE INVENTION

1. Field of the Invention

Embodiments of the invention described herein pertain to the field of horse stall equipment. More particularly, but not by way of limitation, one or more embodiments of the invention enable a tailboard system for horse stalls.

2. Description of the Related Art

Many breeds of horses, particularly animals shown in-hand, require beautiful tails to be competitive. To maintain a long and luxurious tail, owners may keep the horse's tail in a tail set or bustle. In addition, to keep horses at their best appearance, and for other husbandry purposes, show horses are often stabled. Unfortunately, a common behavior of stabled horses is to rub the base of their tails against the stall walls. This undesirable behavior may have many different causes including behavioral and medical reasons. Tail rubbing may also simply be a common vice such as cribbing or weaving. But for the show horses, a ragged and frayed tail may mean an interrupted career. Tail rubbing often causes the hair on the tail to fall out or be pulled out. For example, if the hair gets stuck on a nail and is pulled out, or if the hair falls off from consistent rubbing, the appearance of the tail will be ruined. Hair loss is particularly detrimental for show horses that need to keep a specific, groomed appearance.

Attempts have been made to prevent show horses from rubbing their tails on the walls of their stalls by placing, at a height about 4-6 inches below the base of the tail, wooden, rectangular planks perpendicular to the wall of the stall like a shelf. These planks are referred to in the art as "tailboards."

Proper tailboard placement depends on a number of factors. First, the height of the horse. The height of a horse is measured in "hands," where a hand is four inches. Measurement is made from the ground to the top of the withers (shoulder blades). In general, a horse's shoulders are slightly higher than its hind quarters. Furthermore, horse breeds, and individuals within a breed, will vary in their average height, but stall walls are usually a standard size. The correct placement for a miniature horse would obviously be different than for a draft horse, for example. Another consideration for placement is that individual horses may have a favorite spot or corner where it prefers to rub. Therefore, tailboards should generally be placed on the stall wall at a height appropriate to the area and height where the particular horse rubs. For example, the average Saddlebred horse, has a height of about 60 to 64 inches, which means the tailboards are generally placed lower than 60 to 64 inches, in order to contact the horse approximately 4-6 inches below the tail base, for example.

Tailboards are commonly installed by using a shelf bracket or bracing that can be difficult to install, and the shelf bracket or bracing may create a potential catch point that could injure the horse. Typically, these tailboard installations consist of a 2'×8', 2'×10', or 2'×12' pieces of lumber attached to the wall to keep the horses off the wall. Wooden tailboards are also commonly chewed on, defecated on, and are otherwise easily damaged by the horse, causing the need for the wooden tailboards to be periodically replaced.

As is apparent from the abovementioned problems, current tailboard designs are inconvenient, may cause injury to horses, are easily damaged by the horses, are difficult to install, difficult to maintain and require periodic replacement. Therefore, there is a need for improved tailboard system for horse stalls.

BRIEF SUMMARY OF THE INVENTION

One or more embodiments of the invention enable a tailboard system for horse stalls.

A tailboard system for horse stalls is described. An illustrative embodiment of a tailboard system for a horse stall includes a plurality of tailboard sections, each tailboard section of the plurality of tailboard sections comprising a first arched portion between a first pair of integral flanges, the first pair of integral flanges comprising an integral upper flange and an integral lower flange, the arched portion comprising a pair of straight, angled sides connected by a rounded tip, and at least one tapered end, a first tapered end of the at least one tapered end adjacent to a second tapered end of an adjacent section of the plurality of tailboard sections to form a triangular gap therebetween, and a joint strap covering the triangular gap, the joint strap comprising a second pair of flanges between a second arched portion, and wherein the plurality of tailboard sections are adapted to be mounted by the first pair of integral flanges in a row around at least a portion of an inside perimeter of the horse stall to form the tailboard system. In some embodiments, the plurality of tailboard sections include one of a wall section, an end cap, a corner section, or a combination thereof. In certain embodiments, at least one tailboard section of the plurality of tailboard sections includes an end cap that terminates the row, the end portion comprising a closed, angled end opposite the first tapered end, the closed, angled end forming about a forty-five degree angle with the inside perimeter. In some embodiments, the plurality of tailboard sections are adapted to prevent a horse wearing a tail set from rubbing its tail on the inside perimeter of the horse stall. In some embodiments, the tailboard system further includes a plurality of fasteners extending through the first pair of integral flanges, the plurality of fasteners configured to secure the tailboard section to the inside perimeter of the horse stall. In certain embodiments, the plurality of tailboard sections include molded polyethylene. In some embodiments, the first tapered end has an eight-degree taper.

An illustrative embodiment of tailboard system for a horse stall includes a plurality of tailboard sections, each tailboard section of the plurality of tailboard sections comprising a first rounded portion between a first pair of integral flanges, the first pair of integral flanges comprising an integral upper flange and an integral lower flange, and at least one end, a first end of the at least one end adjacent to a second end of an adjacent section of the plurality of tailboard sections to form a seam therebetween, and a joint strap covering the seam, the joint strap comprising a second pair of flanges between a second rounded portion, and wherein the plurality of tailboard sections are adapted to be mounted by the first pair of integral flanges in a row around at least a portion of an inside perimeter of the horse stall to form the tailboard system. In some embodiments, the plurality of tailboard sections include one of a wall section, an end cap, a corner section, or a combination thereof. In certain embodiments, at least one tailboard section of the plurality of tailboard sections includes an end cap that terminates the row, the end portion comprising a closed, angled end opposite the first end, the closed, angled end forming about a forty-five degree angle with the inside perimeter. In some embodiments, the plurality of tailboard sections are adapted to prevent a horse wearing a bustle from rubbing its tail on the inside perimeter of the horse stall. In certain embodiments, the first rounded portion includes an oblong-shaped profile. In some embodiments, the plurality of tailboard sections are adapted to prevent a horse wearing a tail set from rubbing its tail on the inside perimeter of the horse stall. In certain embodiments, the first rounded portion includes a pair of straight, angled sides connected by a rounded tip. In some embodiments, the first rounded portion includes one of a bell shape or a parabolic shape. In certain embodiments, the tailboard system further includes a plurality of fasteners extending through the first pair of integral flanges, the plurality of fasteners configured to secure the tailboard section to the inside perimeter of the horse stall. In some embodiments, the plurality of fasteners are spaced at intervals around the first pair of integral flanges. In certain embodiments, the plurality of tailboard sections include molded polyethylene.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 5D is a perspective view of a corner section of illustrative embodiments for a horse wearing a tail set.

FIG. 5E is a back view of a corner section of illustrative embodiments for a horse wearing a tail set.

FIG. 5F is a side view of a corner section of illustrative embodiments for a horse wearing a tail set.

Figure 1:
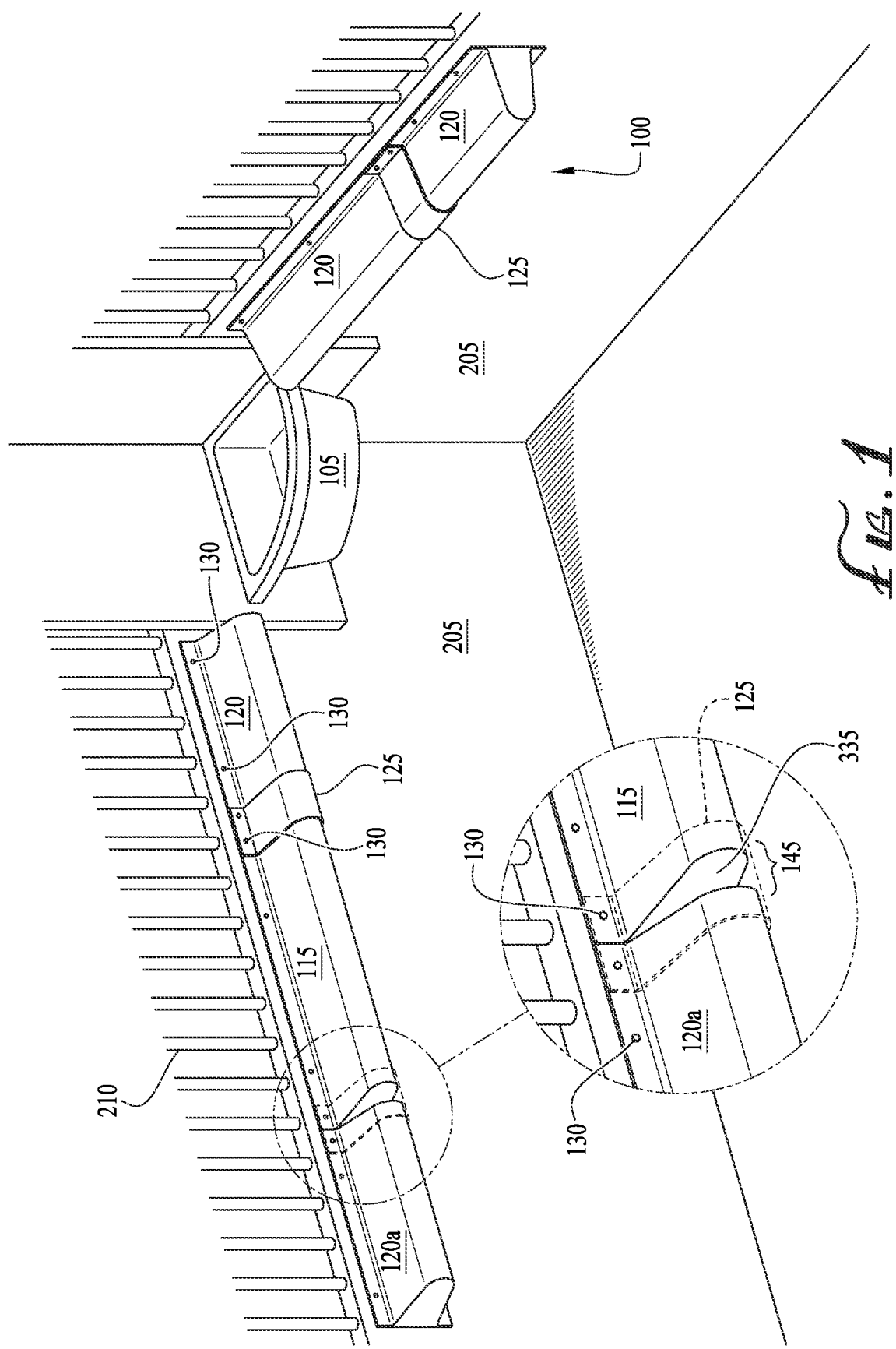
FIG. 1 is a perspective view of a tailboard system of illustrative embodiments for a horse wearing an exemplary tail set.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

A tailboard system for horse stalls will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a wall section includes one or more wall sections.

"Coupled" refers to either a direct connection or an indirect connection (e.g., at least one intervening connection) between one or more objects or components. The phrase "directly attached" means a direct connection between objects or components.

Illustrative embodiments are primarily described herein with respect to horse stalls. However, illustrative embodiments are not so limited and may equally apply to horse trailers, temporary stalls, fences, portable stalls, and stalls for other animals, which animals may undesirably rub against, chew or catch on the walls of the stall.

As used herein references to an animal "rubbing its tail" refers to the animal rubbing the base of its tail, particularly the area of the tail covering the anus.

Illustrative embodiments may provide a safer, more durable, easier to install, improved tailboard system. There may be no brackets for a horse to cast themselves on, there may be no wood or edges to chew on, and the tailboards of illustrative embodiments may be easily installed using an integral flange. The tailboards of illustrative embodiments may be a molded, arch-shaped tailboard that may be affixed to the wall of a horse's stall to prevent the horse from rubbing its tail. A tailboard system of illustrative embodiments may include one or more of four components: corner section, wall section, end cap, and joint strap. Illustrative embodiments may be fabricated by cutting and poly welding, or more preferably, be molded, one-piece components. Certain illustrative embodiments may be a polyethylene tailboard with an arch and/or rounded design. The arch of illustrative embodiments may beneficially make it difficult for a horse to chew on the tailboard. Illustrative embodiments also may eliminate the use of brackets for installation since the tailboards of illustrative embodiments may be screwed directly to the stall using an integral flange. The flange and screw attachment may improve the safety of a stalled horse by eliminating all catch points. The sections of illustrative embodiments may provide an additional advantage of being nestable together for ease and efficiency of shipping or transport. The shape of the tailboard sections of illustrative embodiments may allow the tailboards to protrude far enough from the wall to prevent a horse wearing a tail set from rubbing its tail, while also providing for enough strength to withstand bumping, rubbing and pressure from the weight of the horse.

Tailboards for horses wearing tail sets present a particularly difficult problem because tail sets cause a horse's tail to stick out about twice as far as a bustle. As a result, a conventional tailboard for a horse with a tail set would require a foot-wide barrier between the horse and the wall, and would also be required to be strong enough to withstand a typically 1,200 pound horse from leaning on the tailboard. This has been particularly challenging in the past. Illustrative embodiments provide a unique tailboard shape and mounting that, when installed, extends a foot outward from the wall and may not break or become damaged when bumped, leaned on or otherwise pressured by a horse.

Figure 2:
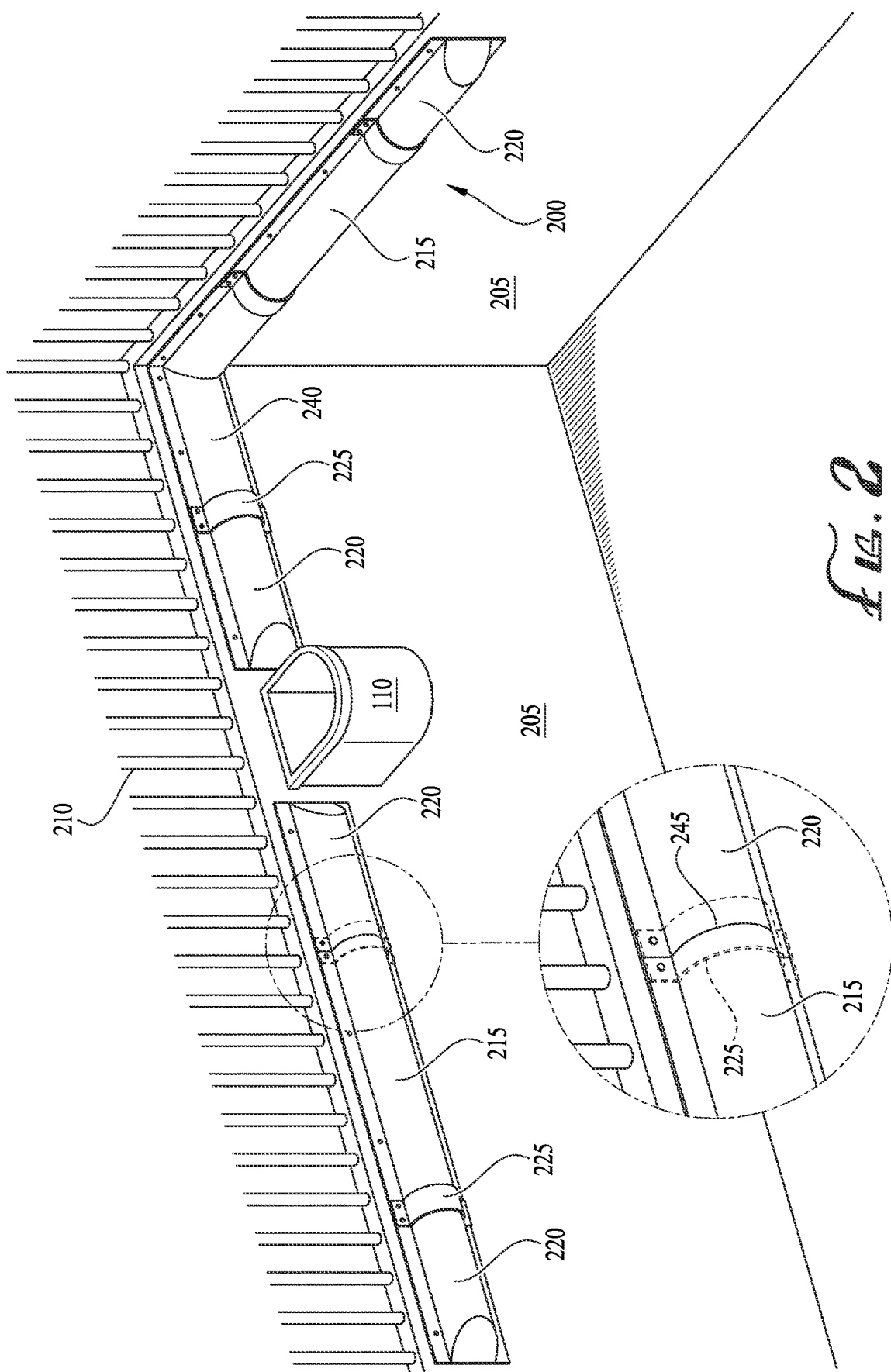
FIG. 2 is a perspective view of a tailboard system of illustrative embodiments for a horse waring an exemplary bustle.

FIG. 1 and FIG. 2 illustrate exemplary tailboard installations of illustrative embodiments. FIG. 1 illustrates exemplary tailboards for a horse wearing a tail set, and FIG. 2 illustrates exemplary tailboards for a horse wearing a bustle. As demonstrated by comparing FIG. 1 and FIG. 2, exemplary tail set tailboard system 100 may protrude further out from wall 205 than exemplary bustle tailboard system 200, since a tail set causes a horse's tail to stick out further from the horse's rear than a bustle. Therefore, the longer profile of tail set tailboard system 100 as compared to bustle tailboard system 200 may decrease the likelihood that a horse is able to reach wall 205 with the base of its tail when wearing a tail set. Tail set tailboard system 100 may include a shape and a mounting design to provide increased strength able to withstand pressure from the weight of the horse.

Turning to FIG. 1, tail set tailboard system 100 may be installed in a row around one or more walls 205 of horse stall 210, for example around the inner perimeter and/or a portion of the inner perimeter of horse stall 210. Tail set tailboard system 100 may be attached to wall 205 at about tail-height, for example a few inches and/or 4-6 inches below the height where the base of a horse's tail would bump into wall 205, for example about 4'8" ft off the ground for a typical Saddlebred horse. In illustrative embodiments tail set tailboard system 100 may not touch the horse's tail at the base of the tail itself, but rather a few inches below the base such that the horse is not inclined to rub its tail on tailboard system 100 itself. In FIG. 1, to the left of water trough 105, one tail set wall section 115 is secured between two tail set end caps 120 and 120a. Two tail set end caps 120 are installed adjacent to one another to the right of water trough 105. In some embodiments, tail set end caps 120 may be reversible and used interchangeably on either the left or right end of the tailboard arrangement by rotating tailboard end cap 120 around by 180°. In certain embodiments, tail set end cap 120 may be left-handed or right-handed.

Tail set joint straps 125 may cover the seams and/or gaps between adjacent sections, for example seam 245 between tail set wall section 115 and tail set end cap 120, seam 245 between two tail set wall sections 115, and so forth. In FIG. 1, one tail set joint strap 125 has been omitted to show an illustrative embodiment of a configuration of adjacent sections forming tail set tailboard system 100. As shown, the sides of tail set end cap 120a and tail set wall section 115 are tapered away from one another in a direction away from wall 205, to provide gap 145 between the two adjacent sections. Gap 145 may increase in size in a direction away from wall 205 and/or may be triangular in shape. Tail set joint strap 125 may be attached to cover gap 145 and provide a truss-like and/or triangular-like configuration for additional strength of the connections between adjacent sections of tail set tailboard system 100.

FIG. 2 illustrates an exemplary bustle tailboard system 200 of illustrative embodiments. In FIG. 2, bustle corner section 240 is shown seated in a corner of stall 210. Bustle corner section 240 may be placed in corners of stall 210, with bustle wall section 215 and/or bustle end cap 220 connecting to one or more sides of bustle corner section 240 such that the sections are adjacent to one another in a row. In FIG. 2, bustle end cap 220 is installed between feeder 110 and bustle corner section 240 on a first side of bustle corner section 240. Bustle wall section 215 is installed on a second side of bustle corner section 240. Bustle joint straps 225 may cover seam 245 between adjacent sections, for example, seam 245 between bustle corner section 240 and bustle wall section 215, seam 245 between bustle corner section 240 and bustle end cap 220, seam 245 between bustle wall section 215 and bustle end cap 220, and so forth. A section of bustle tailboard system 200 may lie flush and/or flat against an adjacent section of bustle tailboard system 200 without any gap 145 and/or adjacent sides of sections may be tapered as described herein with respect to tail set tailboard system 200.

Figure 5A:
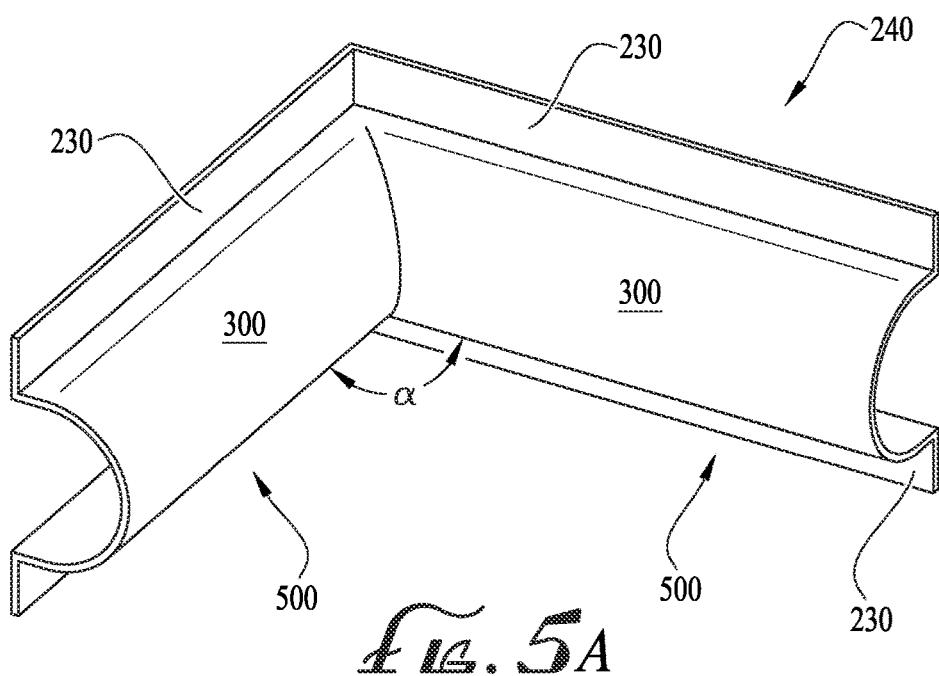
FIG. 5A is a perspective view of a corner section of illustrative embodiments for a horse wearing a bustle.
Figures 5B, 5C:
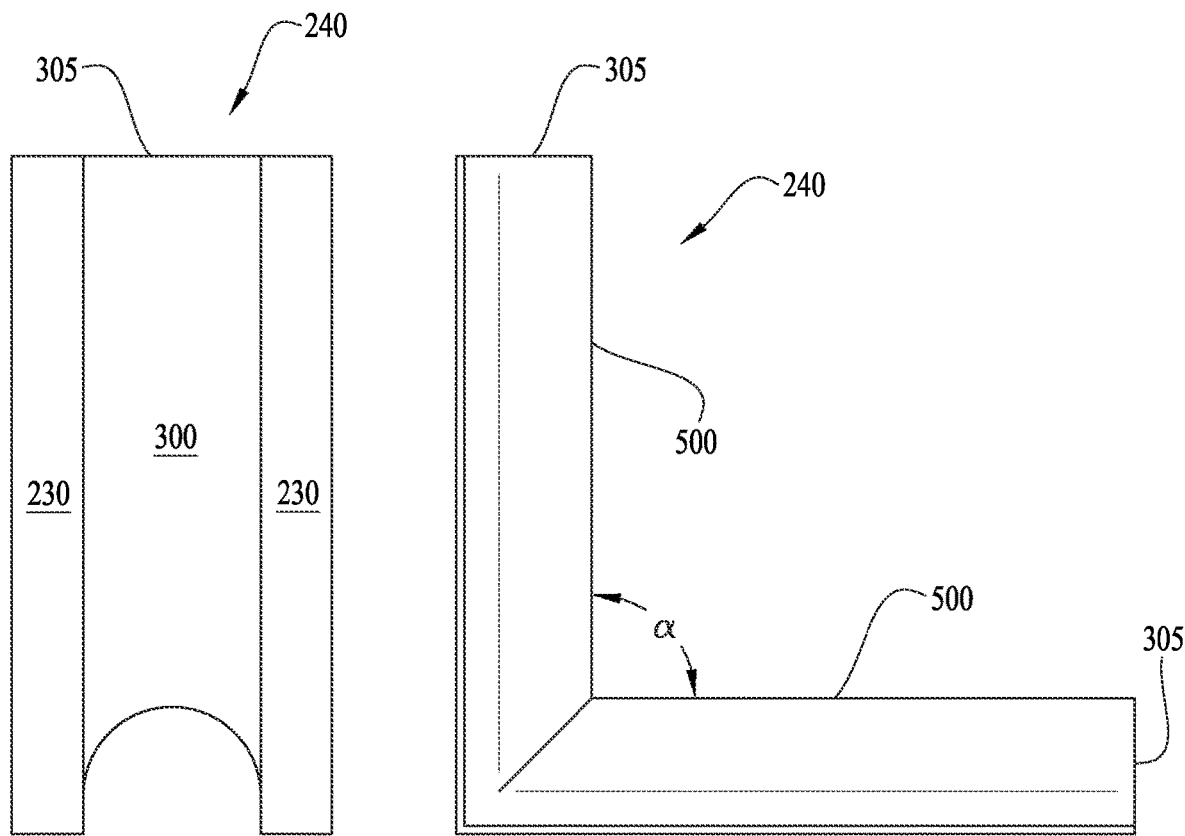
FIG. 5B is a back view of a corner section of illustrative embodiments for a horse wearing a bustle.
FIG. 5C is a side view of a corner section of illustrative embodiments for a horse wearing a bustle.

As demonstrated in FIG. 2, when a horse is wearing a bustle, one or more bustle wall sections 215, bustle end caps 220 and/or bustle corner sections 240 may be arranged in various orderings and combinations, depending on the size and shape of the stall, and whether a space for feeder 110, water trough 105, a door or other stall feature should be accommodated. As demonstrated in FIG. 1, when a horse is wearing a tail set, one or more tail set wall sections 115, tail set end caps 120 and/or tail set corner sections 140 (shown in FIG. 5D) may be arranged in various orderings and combinations, depending on the size and shape of the stall, and whether a space for feeder 110, water trough 105, a door or other stall feature may be accommodated. In FIG. 1 water trough 105 is shown in a corner of stall 210. In FIG. 2, feeder 110 is illustrated in the middle of wall 205, and is surrounded by two bustle end caps 220.

Tailboard system 100, 200 may be made of polyethylene (or another similar plastic), wood or metal, composite, or another similar nontoxic, smooth, shapeable or moldable, and durable material. Polyethylene may provide the benefit of the greatest strength and ability to mold each section in a single piece. In some embodiments, corners 140, 240 and end caps 120, 220 may be fabricated from molded pieces from a mold for wall section 115, 215. Each component of tailboard system 100, 200 may include flanges 230 (shown in FIG. 3A), with flanges 230 integral with the section, and a flange 230 placed on each of the top side and bottom side of the tailboard piece. Flanges 230 may be integral and extend parallel to the plane of wall 205 from rounded portion of section when the component is installed on wall 205. Screws 130 may be screwed through flanges 230 to secure sections of tailboard system 100 200 to wall 205. Screws 130 and/or another fastener such as a cam bolt, nail, spike, cotter pin, toggle bolt, adhesive, rivets and/or another similar fastener may be employed to secure flanges 230 to wall 205.

Figure 3A:
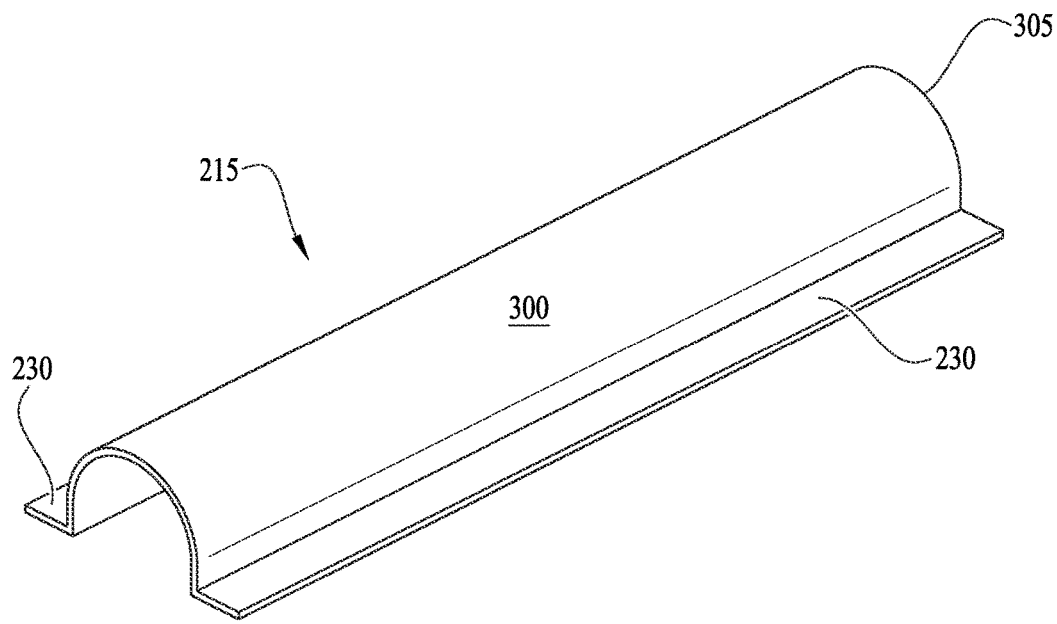
FIG. 3A is a perspective view of a wall section of illustrative embodiments for a horse wearing a bustle.
Figure 3B:
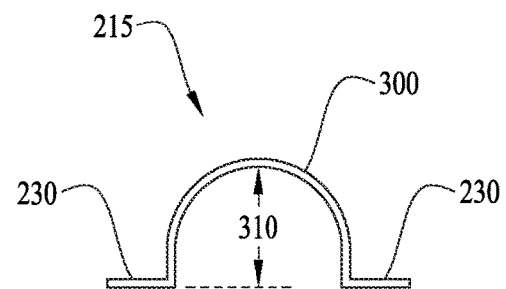
FIG. 3B is a front view of a wall section of illustrative embodiments for a horse wearing a bustle.
Figure 3C:
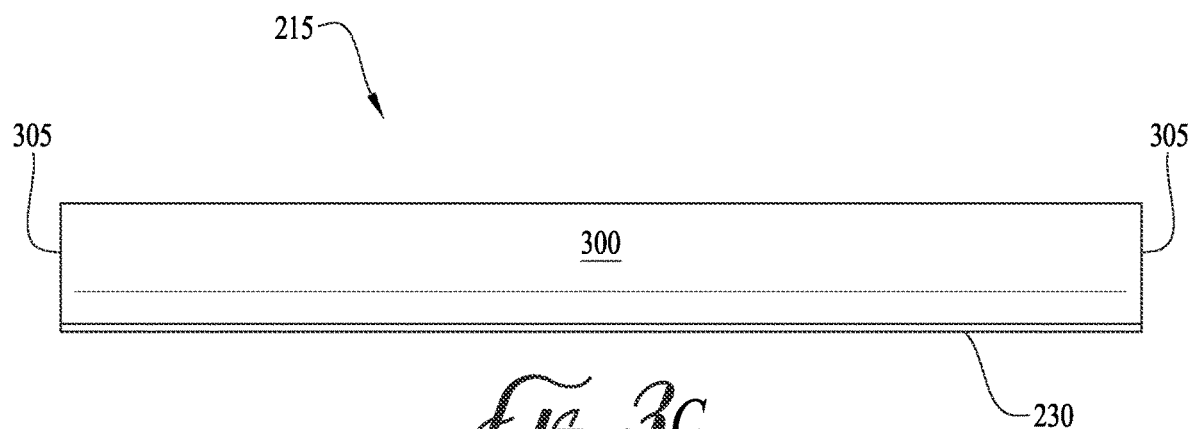
FIG. 3C is a side view of a wall section of illustrative embodiments for a horse wearing a bustle.

FIG. 3A-FIG. 3C illustrate a bustle wall section 215 of illustrative embodiments. Bustle wall section 215 may be straight and hollow. Ends 305 of bustle wall section 215 may be opened or closed. In FIG. 3A, ends 305 of bustle wall section 215 are shown open. Ends 305 may be perpendicular or may be tapered, as described herein with respect to sides 335 of tail set wall section 115. Bustle wall section 215 may include rounded portion 300 extending between two flanges 230. Rounded portion 300 may be round, ovular, oblong, arched or have another similar shape that is rounded without any corners or edges. When bustle wall section 215 is positioned on wall 205, flanges 230 may extend parallel to wall 205 at the top and bottom of rounded portion 300. Rounded portion 300 may form a semi-circle, slightly more than half a circle, or a portion of the surface area of a sphere or oval. Flanges 230 may extend parallel to wall 205 and may be used in conjunction with screws 130 to secure wall section 215 to wall 205. Flanges 230 and screws 130, with bustle joint straps 225 covering seams 245 between adjacent sections, may reduce or eliminate catch points in bustle tailboard system 200. In one nonlimiting illustrative embodiment, bustle wall section 215 may be 2, 3, or 4 feet long, for example, rounded portion 300 may be 8 inches in diameter, and flange 230 may be 3 inches long, 2 inches thick and extend radially outward from the edge of rounded portion 300 at the base of rounded portion 300 that rests against wall 205 when installed.

Rounded portion 300 may assist in preventing a horse from chewing on tailboard system 200. In bustle embodiments, rounded portion height 310 may be a low profile as compared to a conventional tailboard and allow rounded portion to stick out only about six inches from wall 205. This low profile may prevent the horse from defecating on tailboard system 200. In molded polyethylene embodiments, material thickness for the mold may be 0.0625 in one exemplary embodiment. In some embodiments, all components may be molded at a 12 # shot weight, except for bustle joint straps 225. Bustle joint straps 225 may be molded at 6 # to reduce the profile of bustle joint straps 225. Exemplary dimensions provided herein are for an illustrative 10-foot× 10-foot, or 12-foot×12-foot, stall 210. Those of skill in the art may appreciate that dimensions of sections of tailboard system 200 of illustrative embodiments may vary depending on stall size, the size and type of animal held within the stall and/or the type of tail trainer worn by the animal, if any. Wall section 215 may be molded or formed of a different size or cut with a hand saw to accommodate smaller stalls.

Figure 3D:
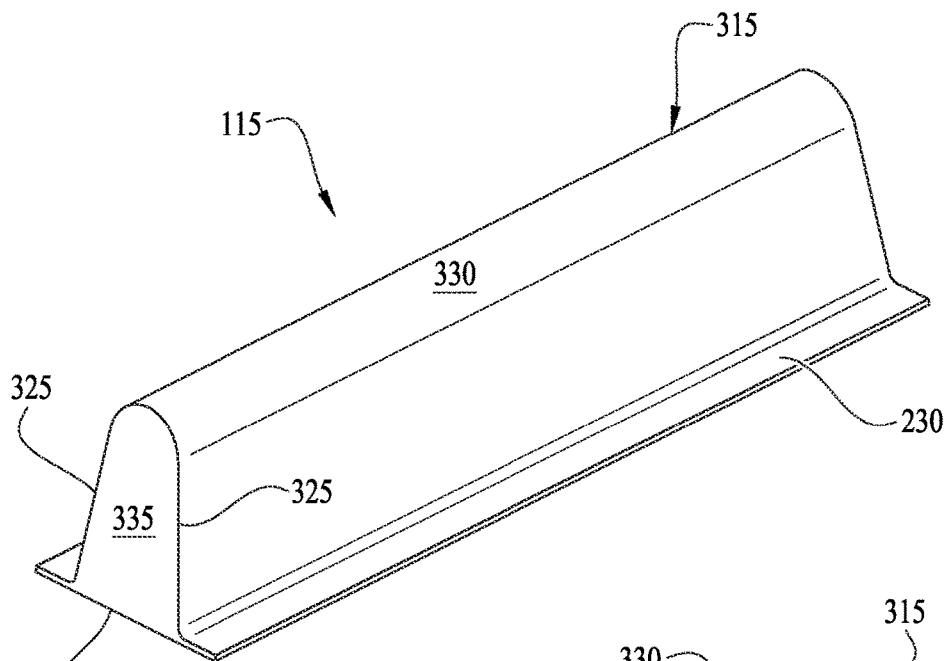
FIG. 3D is a perspective view of a wall section of illustrative embodiments for a horse wearing a tail set.
Figure 3E:
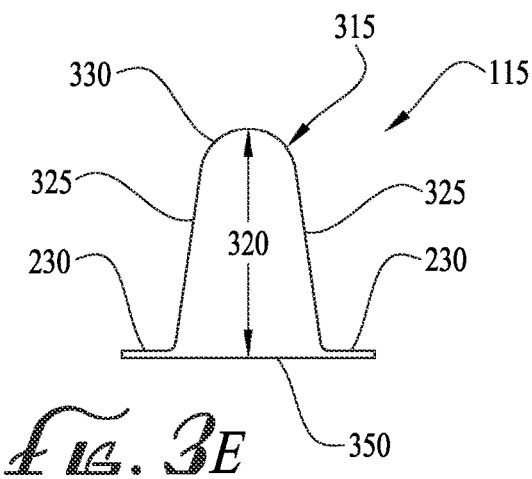
FIG. 3E is a front view of a wall section of illustrative embodiments for a horse wearing a tail set.
Figure 3F:
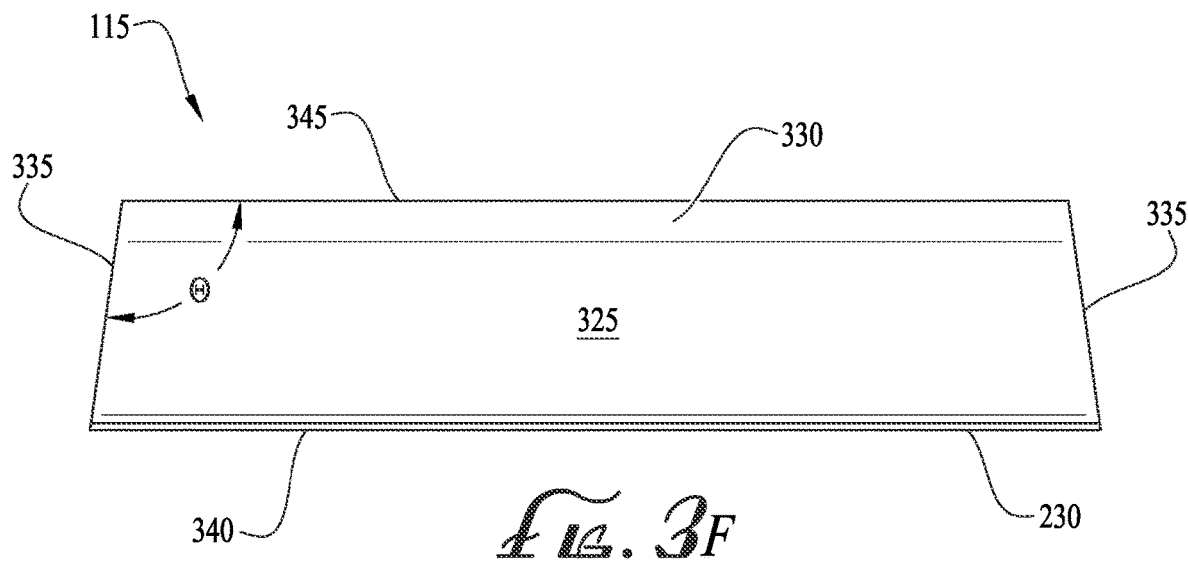
FIG. 3F is a side view of a wall section of illustrative embodiments for a horse wearing a tail set.

FIGS. 3D-3F illustrate a tail set wall section 115 of illustrative embodiments. Tail set wall section 115 may be similar to bustle wall section 215, except tail set wall section 115 may include arched portion 315 extending between a pair of flanges 230. Arched portion 315 may protrude outwards from wall 205 far enough to prevent a horse wearing a tail set from touching wall 205 with the base of its tail. For example, arched portion 315 may include arched portion height 320 of about twelve inches or about twice as high as rounded portion height 310 of bustle wall section 215. Arched portion 315 may be parabolic, shaped like an arch with angled sides or bell shaped. In some embodiments arched portion 315 may include straight slanted sides 325 connected by rounded tip 330. Straight slanted sides 325, rather than curved sides, may provide strength while simultaneously permitting tail set wall section 115 to be nested with other tail set wall sections 115 during transport or storage. In some embodiments, arched portion 315 may be shaped similarly to rounded portion 300, or vice versa.

Terminal sides 335 of tail set wall section 115 may be taper outward towards wall 205, with angle θ being about 98°, and/or an angle slightly larger than perpendicular rather than perpendicular. Tapering of terminal sides 335 may provide the truss-like configuration and/or triangular gap 145 illustrated in the enlarged portion of FIG. 1. When tail set joint strap 125 is installed over gap 145, gap 145 may be covered from view, and tail set joint strap 125 may provide a triangular support system. In FIG. 3D and FIG. 3E, terminal sides 335 are shown closed, but terminal sides 335 may also be open, for example, if tail set wall section 115 is cut or sawed to shorten its length. In one nonlimiting example, the length of base 340 may be 36.45 inches, whilst the length of apex 345 may be 32.52 inches. In this example, the bottom of arched portion 315 may be 14.24 inches wide including flanges 230. Each flange may be 3.26 inches wide, and therefore bottom 350 of arched portion 315 may be 7.72 inches exclusive of flanges 230. Each flange 230 may be about 2 inches thick, and the diameter of rounded tip 330 may be 5.05 inches. In another nonlimiting example, the length of base 340 may be 19.4 inches, while the length of apex 345 may be 23.87 inches.

Figure 4A:
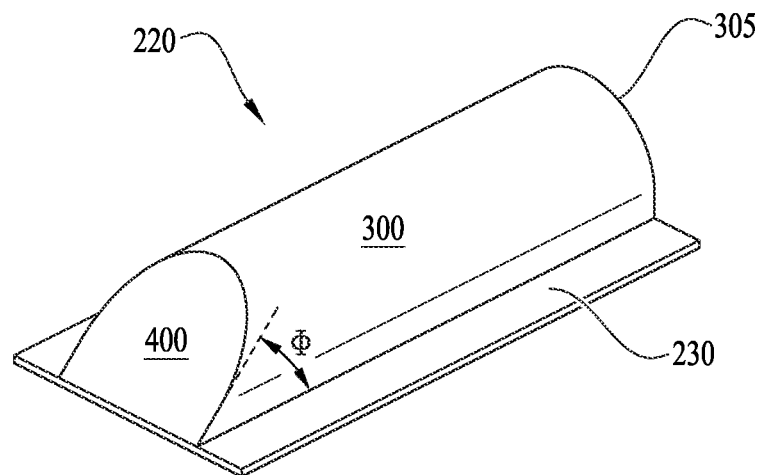
FIG. 4A is a perspective view of an end cap of illustrative embodiments for a horse wearing a bustle.
Figure 4B:
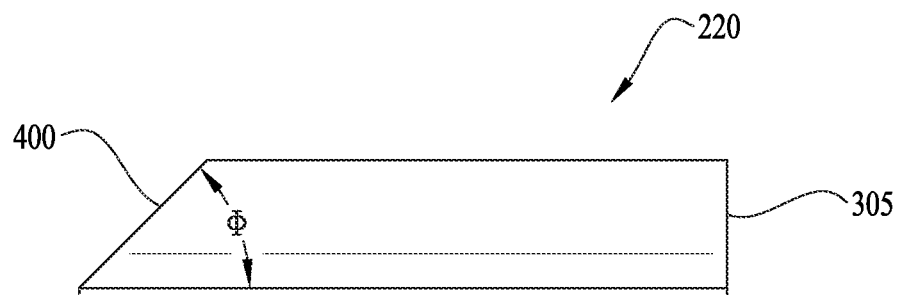
FIG. 4B is a side view of an end cap of illustrative embodiments for a horse wearing a bustle.
Figure 4C:
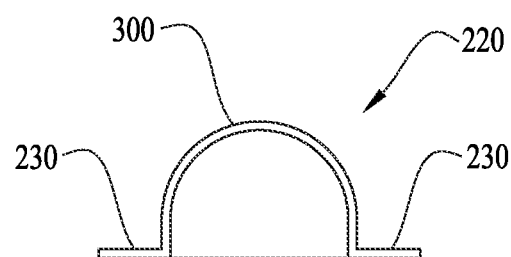
FIG. 4C is a front view of an end cap of illustrative embodiments for a horse wearing a bustle.

FIG. 4A-4C illustrate bustle end cap 220 of illustrative embodiments. Bustle end cap 220 may be shaped similarly to bustle wall section 215 including rounded portion 300 and flanges 230, except that end cap 220 may have one closed, angled bustle end 400 that may cap and/or close an end of bustle tailboard system 200. For example, one bustle end cap 220 may be at each end of tailboard system 200. Closed, angled end 400, may create a terminal end of bustle tailboard system 200, and may create a smooth end that may be difficult for a horse to chew on or become caught on, and may also close tailboard system 200 from dirt and debris. In one nonlimiting embodiment, end cap 220 may be 30 inches in length, and angle φ may be 45°. When placed in stall 210, end cap 220 may be aligned with the last bustle wall section 215 or bustle corner section 240 to form the terminal end of bustle tailboard system 100.

Figure 4D:
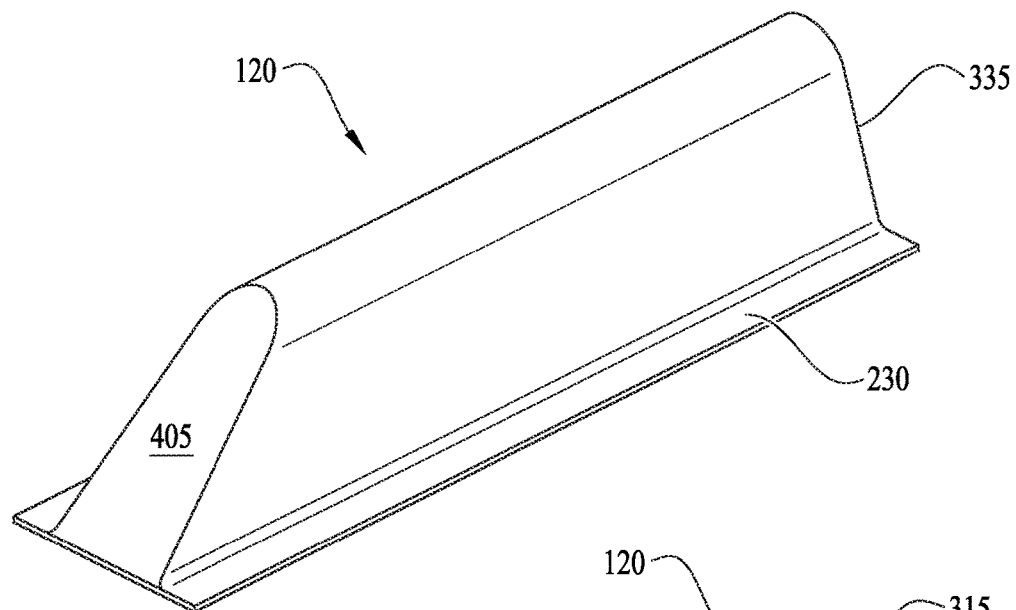
FIG. 4D is perspective view of an end cap of illustrative embodiments for a horse wearing a tail set.
Figure 4E:
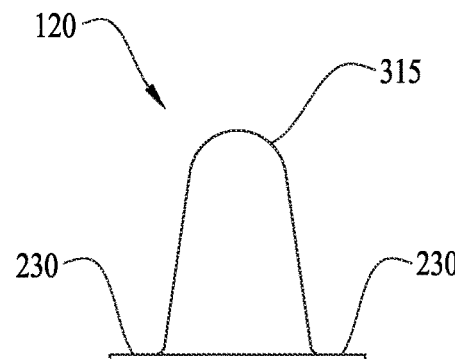
FIG. 4E is a front view of an end cap of illustrative embodiments for a horse wearing a tail set.
Figure 4F:
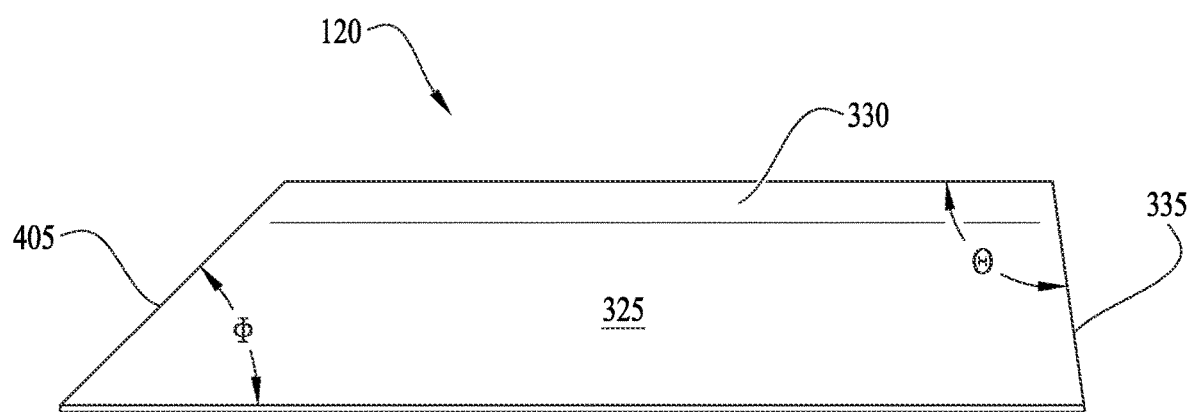
FIG. 4F is a side view of an end cap of illustrative embodiments for a horse wearing a tail set.

FIG. 4D-4F illustrate tail set end cap 120 of illustrative embodiments. Tail set end cap 120 may be shaped similarly to tail set wall section 115, including arched portion 315 and flanges 230, except that tail set end cap 120 may have one closed, angled tail set end 405 that may cap and/or close an end of tail set tailboard system 200, in similar fashion to bustle end cap 220. The second side of tail set end cap 120, may include tapered side 335, such that tail set end cap 120 may include gap 145 between itself and an adjacent section on the side of end cap 120 that is not at the end of the row of sections.

FIGS. 5A-5D illustrate bustle corner section 240 of illustrative embodiments. Bustle corner section 240 may be similar to bustle wall section 215, but include a 90° bend or about a 90° bend in the center so as to fit and/or mate inside and/or around a corner of the inner perimeter of stall 210. In the example shown in FIG. 5C, corner section 240 may include two corner sides 500, which may for example be 30-inch-long sections, connected together at a 90° angle α, for example. Bustle corner sections 240, bustle wall sections 215 and/or bustle end caps 220 may be organized in various arrangements, as desired, to fit the size and features of a particular stall 210.

FIGS. 5D-5F illustrate tail set corner section 140 of illustrative embodiments. Those of skill in the art will appreciate that tail set corner section 140 may be similar to bustle corner section 240, but instead with the features of tail set wall sections, such as arched portion 315, angle θ and tapered sides 335, for example.

Figure 6A:
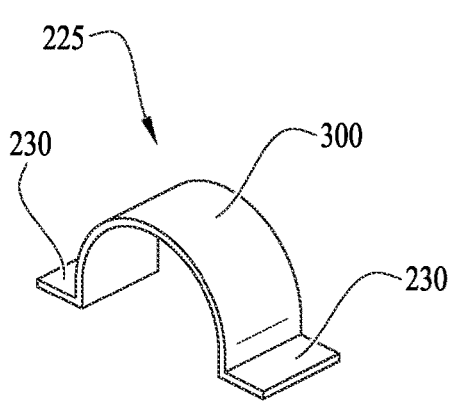
FIG. 6A is a perspective view of a joint strap of illustrative embodiments for a horse wearing a bustle.
Figure 6D:
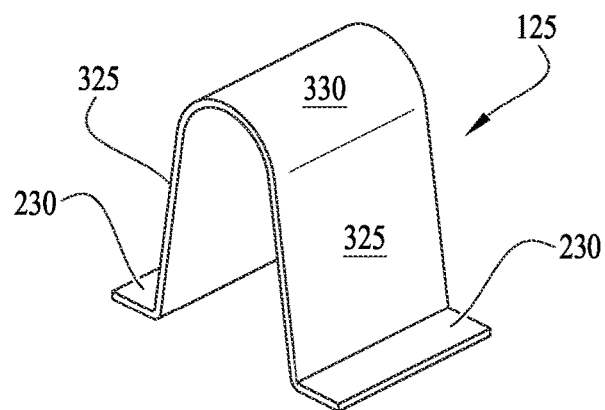
FIG. 6D is a perspective view of a joint strap of illustrative embodiments for a horse wearing a tail set.
Figure 6B:
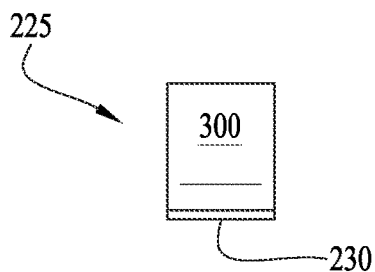
FIG. 6B is a side view of a joint strap of illustrative embodiments for a horse wearing a bustle.
Figure 6E:
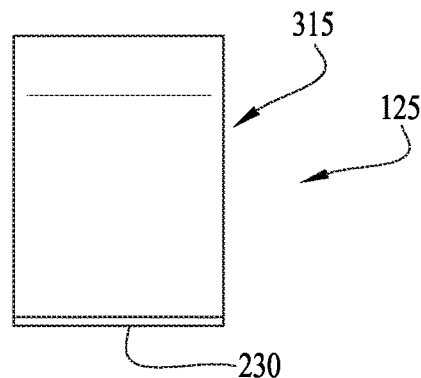
FIG. 6E is a side view of a joint strap of illustrative embodiments for a horse wearing a tail set.
Figure 6C:
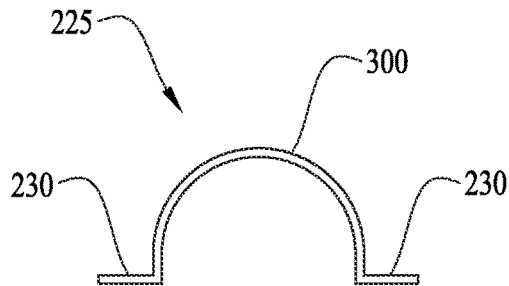
FIG. 6C is a front view of a joint strap of illustrative embodiments for a horse wearing a bustle.
Figure 6F:
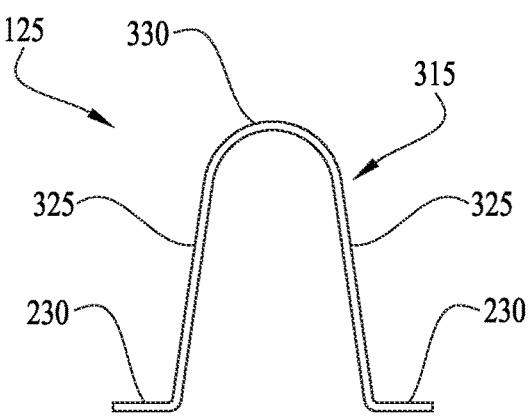
FIG. 6F is a front view of a joint strap of illustrative embodiments for a horse wearing a tail set.

FIGS. 6A-6C illustrate a bustle joint strap 225 of illustrative embodiments. FIGS. 6D-6F illustrate an exemplary tail set joint strap 125 of illustrative embodiments. Bustle joint straps 225 and/or tail set joint straps 125 may attach over seam 245 and/or triangular gap 145 between any two pieces in bustle tailboard system 200 and tail set tail board system 100, respectively. For example, bustle joint strap 225 may attach over seam 245 between bustle wall section 215 and an adjacent bustle wall section 215, between bustle wall section 215 and bustle corner section 240, etc. Similarly, tail set joint strap 125 may attach over seam 245 and/or triangular gap 145 between tail set wall section 115 and an adjacent tail set wall section 115, tail set wall section 115 and tail set corner section 140, tail set wall section 115 and tail set end cap 120, and so forth. Similar to bustle wall section 215, bustle joint strap 225 may include rounded portion 300 extending between two flanges 230 but may be a narrow strip rather than a tube. Tail set joint strap 125 may include arched portion 315 between two flanges 230, and may be a strip wide enough to fully cover triangular gap 145.

Figure 7:
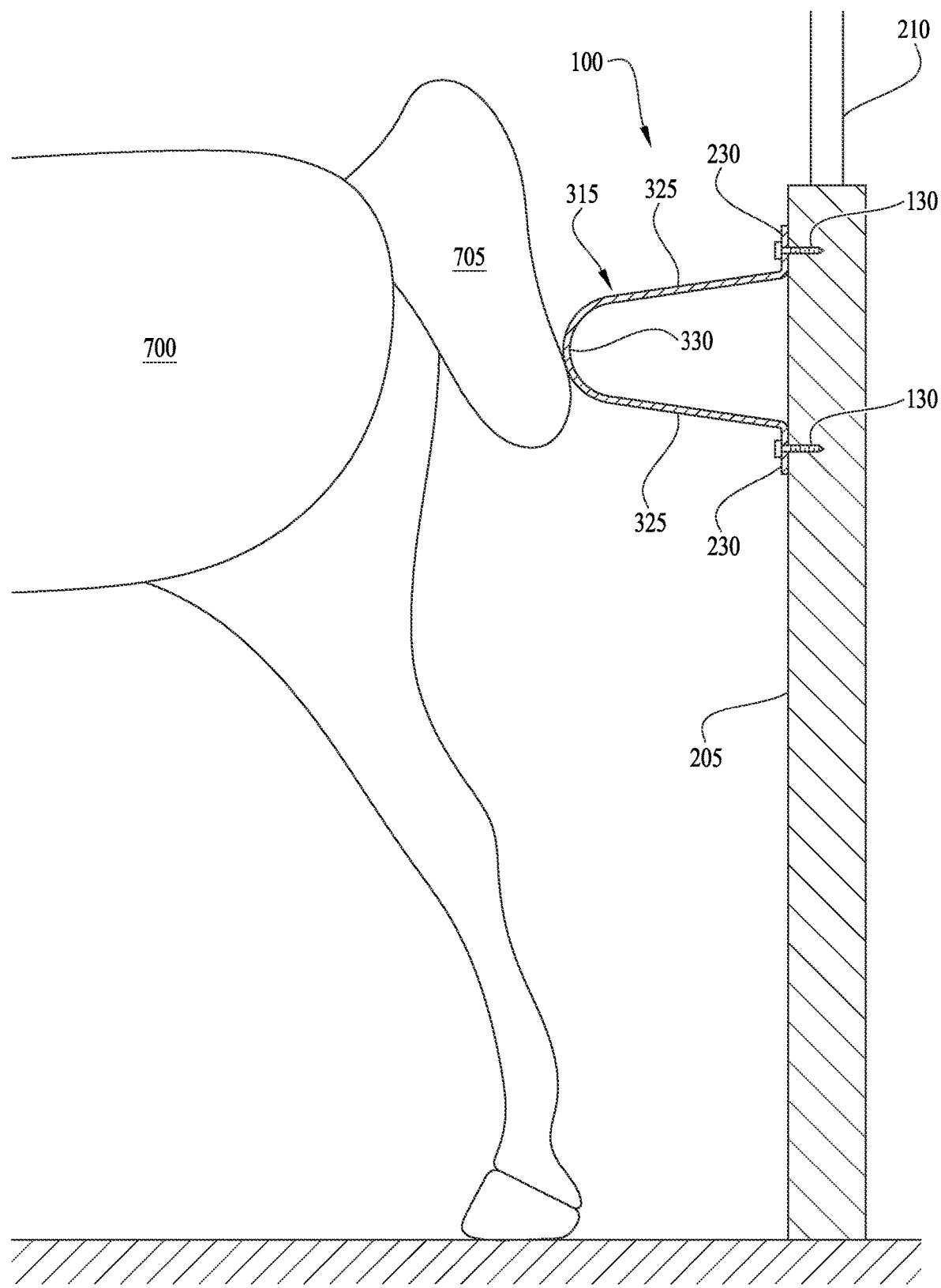
FIG. 7 is a cross sectional view of a horse wearing a tail set in a stall having a tailboard system of illustrative embodiments installed.

FIG. 7 illustrates an exemplary horse 700 inside stall 210. In FIG. 7, horse 700 is wearing tail set 705. As shown in FIG. 7, tail set tailboard system 100 may prevent horse 700 from rubbing its tail on wall 205. Particularly, tailboard system 100 may provide a barrier that prevents horse 700 from rubbing the base of its tail against wall 205. Tailboard system 100 may include arched portion 315 that extends outward from wall 205 an arched portion height 320 that is long enough to prevent horse 700 wearing tail set 705 to reach wall 205 with the base of its tail, for example 11.5 or 12 inches from wall 205. Further tailboard system 100 may provide sufficient strength to withstand rubbing, bumping and abutting from horse 700. Tail set tailboard system 100 may be free from any catch points or chew points. Sections of tailboard system 100 may be advantageously nestable for storage and/or transport, similar to the nesting of paper cups.

Illustrative embodiments may include a method of installing tail set tailboard system 100 or bustle tailboard system 200. First the height of installation of the tailboard system 100, 200 may be established by determining the height of the base of the horse's 700 tail (or a few inches, such as 4-6 inches below the base) and measuring such location on stall 210. A line may be marked with a marker or chalk to mark the location where the top of the upper flanges 230 should align. Next, corner sections 140, 240 may be started with, if any, and line up corner sections 140, 240 and ensure corner sections 140, 240 are level marked. Wall sections 115, 215 and/or end caps 120, 220 may then be connected in a row with the corner section 120, 220, with the sections in the desired combination. Pilot holes may be drilled along the flanges 230, for affixing the sections to wall 205. Pilot holes may be evenly spaced and, in some embodiments, no more than 12 inches apart. Joint straps 125, 225 may be used to cover all seams 245 and/or triangular gaps 145. Joint straps 125, 225 may screw down through flanges 230 and tighten against wall section 115, 215, end cap 120, 220 and/or corner section 140, 240 as applicable to a particular seam 245 and/or triangular gap 145.

If modifications are needed to any pieces, such as to accommodate a beam or other feature of stall 210 such as a wall stiffener or structural post, wall section 115, 215, end cap 120, 220 and/or corner section 140, 240 may be cut with a hand saw to make a space for the relevant feature. The modified section may be secured with screw 130 within one inch on either side of the modification.

Screws 130 for attachment of flanges 230 and/or joint straps may be lag type, truss head screws, although the type of screw needed may depend on the construction of the stall 210. Screw 130 may include a large head or washer to make the head as large as possible so as not to pull through tailboard system 100, 200. Those of skill in the art may appreciate that other similar fasteners known to those of skill in the art may be similarly employed.

Illustrative embodiments may provide an improved tailboard system that may be safer for horse 700, may prevent damage to the horse's tail and/or hair loss, lasts longer than conventional tailboards, reduces catch points, and/or may mitigate the horse chewing or defecating on the tailboard. Illustrative embodiments may be suitable for horses 700 wearing tail sets 705, and may be long enough to prevent tail-rubbing while a horse is wearing tail set 705, and also have enough strength to avoid breakage despite, in some embodiments, a foot-long length protrusion from wall 205 and pressure from the weight of horse 700. Illustrative embodiments may be nestable and/or stackable for transport or storage. Illustrative embodiments may provide a tailboard that improves the ability of a horse's tail to remain intact—such as in a tail trainer like a tail set or bustle—while the horse is inside stall 205. These benefits may be accomplished at least by the specific shape and mounting features described herein.

A tailboard system for horse stalls has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A tailboard system for a horse stall, comprising:
a plurality of tailboard sections, each tailboard section of the plurality of tailboard sections comprising:
   a first arched portion between a first pair of integral flanges, the first pair of integral flanges comprising an integral upper flange and an integral lower flange, the arched portion comprising a pair of straight, angled sides connected by a rounded tip; and
   at least one tapered end, a first tapered end of the at least one tapered end adjacent to a second tapered end of an adjacent section of the plurality of tailboard sections to form a triangular gap therebetween; and
a joint strap covering the triangular gap, the joint strap comprising a second pair of flanges between a second arched portion; and
wherein the plurality of tailboard sections are adapted to be mounted by the first pair of integral flanges in a row around at least a portion of an inside perimeter of the horse stall to form the tailboard system.

2. The tailboard system of claim 1, wherein the plurality of tailboard sections comprise one of a wall section, an end cap, a corner section, or a combination thereof.

3. The tailboard system of claim 1, wherein at least one tailboard section of the plurality of tailboard sections comprises an end cap that terminates the row, the end cap comprising a closed, angled end opposite the first tapered end, the closed, angled end forming about a forty-five degree angle with the inside perimeter of the horse stall.

4. The tailboard system of claim 1, wherein the plurality of tailboard sections are adapted to prevent a horse wearing a tail set from rubbing its tail on the inside perimeter of the horse stall.

5. The tailboard system of claim 1, comprising a plurality of fasteners extending through the first pair of integral flanges, the plurality of fasteners configured to secure at least one tailboard section of the plurality of tailboard sections to the inside perimeter of the horse stall.

6. The tailboard system of claim 1, wherein the plurality of tailboard sections comprise molded polyethylene.

7. The tailboard system of claim 1, wherein the first tapered end has an eight-degree taper.

* * * * *